United States Patent [19]

Wyatt

[11] Patent Number: 4,627,036

[45] Date of Patent: Dec. 2, 1986

[54] VERTICAL SEISMIC PROFILING

[75] Inventor: Kay D. Wyatt, Bartlesville, Okla.

[73] Assignee: Phillips Petroleum Company, Bartlesville, Okla.

[21] Appl. No.: 433,752

[22] Filed: Oct. 8, 1982

[51] Int. Cl.$^4$ .............................................. G01V 1/32
[52] U.S. Cl. ....................................... 367/57; 367/73; 364/806
[58] Field of Search ............... 364/421, 422, 806; 367/25, 27, 50, 52, 57, 58, 63, 73, 68, 74, 14, 37, 53, 56; 181/102

[56] References Cited

U.S. PATENT DOCUMENTS

| | | | |
|---|---|---|---|
| 3,185,994 | 5/1965 | Woods et al. | 367/74 |
| 3,481,425 | 12/1969 | Smith, Jr. et al. | 367/86 |
| 3,500,950 | 3/1970 | Roever | 367/35 |
| 3,671,929 | 6/1972 | Ruehle et al. | 367/74 |
| 4,214,226 | 7/1980 | Narasmhan et al. | 367/27 |
| 4,298,967 | 11/1981 | Hawkins | 367/57 |
| 4,330,873 | 5/1982 | Peterson | 367/68 |

FOREIGN PATENT DOCUMENTS

| | | |
|---|---|---|
| 574789 | 4/1959 | Canada . |
| 1569582 | 1/1980 | United Kingdom . |
| 2029016 | 3/1980 | United Kingdom . |

OTHER PUBLICATIONS

Hardage, "An Examination of Tube Wave Noise in Vertical Seismic Profiling Data", Geophysics vol. 46 No. 6, Jun. (1981), pp. 892–903.

Gal 'Perin "Vertical Seismic Profiling" Hedra Publishing Company (Russian) 1971, 1974.

Ireson "The U.S.P. as an interprefection tool for structural stratigraphic analysis, presented at the 43rd meeting of the EAE ®, Venice, Italy (paper).

Coffeen, "Seismic Exploration Fundamentals" Text the Petroleum Publishing Co., Tulsa Oklahoma, (1978).

Sheriff, "Encyclopedic Dictionary of Exploration Geophysics", Published by the Society of Exploration Geophysicists, Tulsa, Oklahoma, (1973).

Sheriff et al., "Exploration Seismology vol. 1: History, Theory & Data Acquisition", Cambridge University Press, (1982).

Primary Examiner—Thomas H. Tarcza
Assistant Examiner—Daniel T. Pihulic
Attorney, Agent, or Firm—French and Doescher

[57] ABSTRACT

In vertical seismic profiling (VSP), VSP seismic data is transformed into surface seismic data by mapping segments of the VSP seismic data into surface seismic data time. The transformation results in data which is more easily interpreted with respect to determining subsurface structure because the data is stacked and because the data is in a more conventional form.

6 Claims, 11 Drawing Figures

SYNTHETIC VSP RESPONSE

VERTICAL SEISMIC PROFILING

This invention relates to a method for determining subsurface structure using vertical seismic profiling (VSP).

BACKGROUND OF THE INVENTION

VSP is a measurement procedure in which a seismic source on or near the earth's surface transmits energy to a geophone secured at a desired depth to the wall of a borehole. This type of seismic recording differs from ordinary surface seismic reflection shooting primarily in the manner in which the geophones are positioned. In common midpoint shooting performed on land or in the sea, receivers are distributed laterally on the surface of the earth along the direction of profile. In VSP, geophones are positioned vertically to depths of sometimes several thousand feet and no receivers are generally positioned on the surface. Thus, the direction of geophone deployment differs by 90° degrees in the two types of seismic recording.

In VSP, the seismic source is generally located as close to the borehole as possible. The idea is to send energy vertically downwards to reflecting interfaces so that the reflected energy will return vertically upwards to the borehole geophone located in the well. Data shot in this manner can be utilized to correlate sonic log data with conventional surface seismic data shot in the area of the well. However, this type of data has very little use in determining subsurface structure at any distance from the well since the energy travels substantially vertically.

There would be a number of advantages in using VSP to determine subsurface structure. Since the receivers are buried within the earth rather than on the surface, the receivers are less affected by distortion and noise which are generally present in surface seismic data. Also, since the receivers are so close to the reflectors of interest, the receivers have a greater ability to resolve the structure in the immediate vicinity of the borehole.

It is thus an object of this invention to provide a method for determining subsurface structure using VSP.

BRIEF DESCRIPTION OF THE INVENTION

In accordance with the present invention, VSP is conducted by locating the seismic source at a substantial distance from the well. Seismic data thus obtained is then transformed into seismic data which has the appearance of seismic data which would be obtained using conventional seismic exploration techniques which employ surface receivers (referred to hereinafter as "surface seismic data"). The surface seismic data can be interpreted by standard techniques to determine subsurface structure with, in some cases, more precision than could be obtained using only the conventional surface seismic data obtained using surface receivers.

The basic steps performed in making the transformation from VSP seismic data to surface seismic data are as follows:

1. Select a VSP data trace from the VSP seismic data.
2. Map a segment of the selected VSP data trace at its VSP time into a segment of surface seismic data at its appropriate surface seismic time and lateral offset from the borehole. Since the surface seismic data is a plot of surface seismic time as a function of distance from the borehole, the mapping may also be considered as mapping segments of VSP data into the correct location on such a slot.
3. Repeat steps 1-2 for all desired VSP data traces.
4. Sum samples which accumulate at the same surface seismic data time and at the same distance from the borehole on the surface seismic data being produced from the VSP seismic data.

The term "moveout" is a well recognized term in the art of exploration geophysics. The term generally refers to the difference in arrival time of waves at different geophone positions even though the waves were reflected from the same point on a reflector. To stack the data for a common point on the reflector in order to enhance the subsurface structure information, it is necessary to apply what is referred to as a moveout correction. For surface seismic data this is typically accomplished by correlating all arrival times to the time which would be required for a wave to travel from a source, located directly above the reflection point, to the reflector and back to a receiver located directly above the reflection point.

The same problem is present in transforming VSP seismic data to surface seismic data. The waves received by various geophones may be from the same reflection point and thus the output from the geophones should be stacked. However, the waves will again have different arrival times and it has not been known in the past how a correction could be applied to VSP seismic data such that stacking could be performed. The procedure used in the present invention is a mapping of a segment of a VSP data trace into a segment of surface seismic data to place the data in a form that can be stacked to produce surface seismic data from VSP seismic data.

BRIEF DESCRIPTION OF THE DRAWINGS

Other objects and advantages of the invention will be apparent from the foregoing brief description of the invention and the claims as well as the detailed description of the drawings which are briefly described as follows:

DETAILED DESCRIPTION OF THE INVENTION

Figure 1:
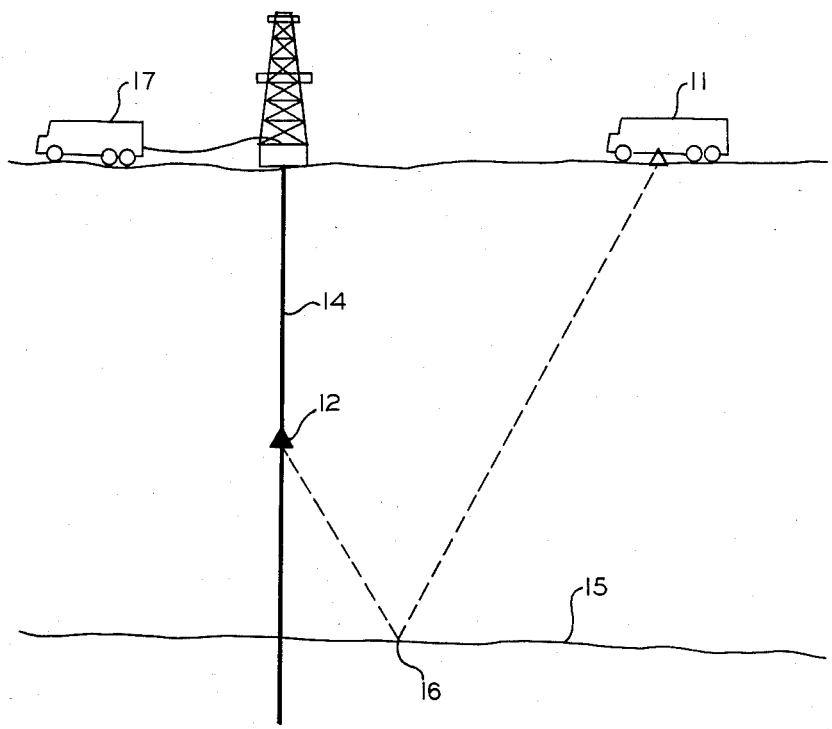
FIG. 1 is a typical field geometry for the acquisition of the VSP seismic data.

Referring now to FIG. 1, there is illustrated a typical VSP configuration. The Vibroseis ® source 11 is illustrated as imparting energy into the earth. It is noted that any other suitable seismic source such as explosives could be utilized if desired.

A geophone 12 is shown located at a desired depth in the borehole 14. For the location of the geophone 12, energy would be reflected from the subsurface strata 15 at point 16. The output produced from geophone 12 is recorded by the recording truck 17.

In VSP, the geophone 12 would typically be moved to a new location for each shot with the distance between geophone locations being some constant distance such as 50 feet. If desired, a string of geophones spaced apart by some desired distance could be utilized or a plurality of sources spaced apart could be used.

The offset of the source 11 from the well 14 is one of the most critical parameters to be selected if the VSP data is to be used to determine the subsurface structure. In general, the amount of subsurface imaged increases with source offset. For the simple case of a single horizontal interface, the interface is imaged out to 500 feet for a source offset of 1000 feet. For an offset of 500 feet, only 250 feet of the interface is imaged. Some structural features quite near the well may not be imaged at all if the source offset is too small. On the other hand, if the offset is too large, there may be a problem of deterioration of the VSP data due to compressional-to-shear mode conversions. A source offset in the range of about 300 feet to about 3000 feet is generally preferred.

The source should be placed so that the subsurface reflection points lie, in general, in the plane containing the borehole and the source location. For example, if there is general subsurface dip, the source should be offset along the dip direction rather than along the strike direction in order to avoid out-of-profile reflections.

The proper source location will also depend on the specific subsurface structure to be imaged. A much broader region of the subsurface is imaged if the source is placed updip rather than downdip.

In general, the number of reflection points along an interface is equal to the number of borehole geophone stations above it. The stacking fold in the data transformation of the present invention depends on the density of reflection points. The stacking fold can therefore be controlled by changing the geophone station spacing. If the spacing is decreased the stacking fold is increased and, conversely, if the spacing is increased the fold decreases. The geophone spacing also influences aliasing in the VSP data. The preferred geophone spacing is in the range of about 25 feet to about 100 feet.

Figure 2:
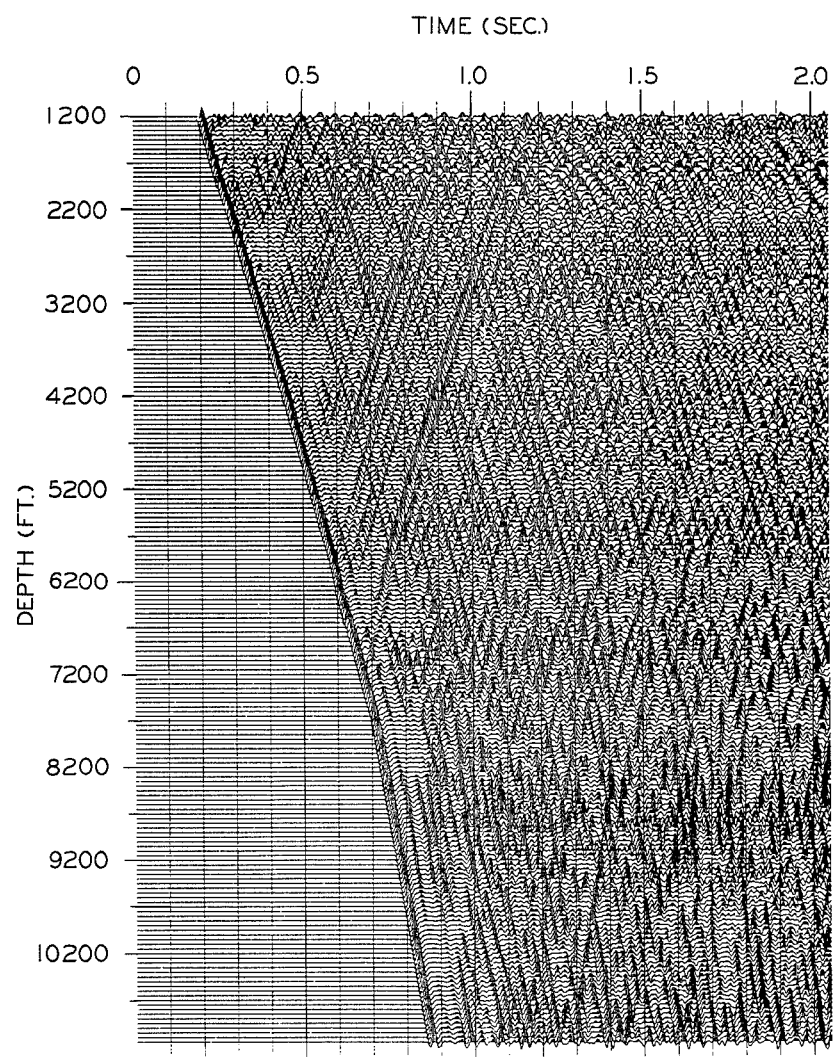
FIG. 2 is an illustration of actual VSP seismic data.

Data obtained by VSP has the appearance of that illustrated in FIG. 2. The data illustrated in FIG. 2 was obtained using a Vibroseis ® source located 1000 feet from the well. The Vibroseis ® source provided a 14 second sweep from 10 to 80 hz. The borehole geophone was located at stations every 50 feet between depths of 1200 feet and 11,150 feet.

Figure 3:
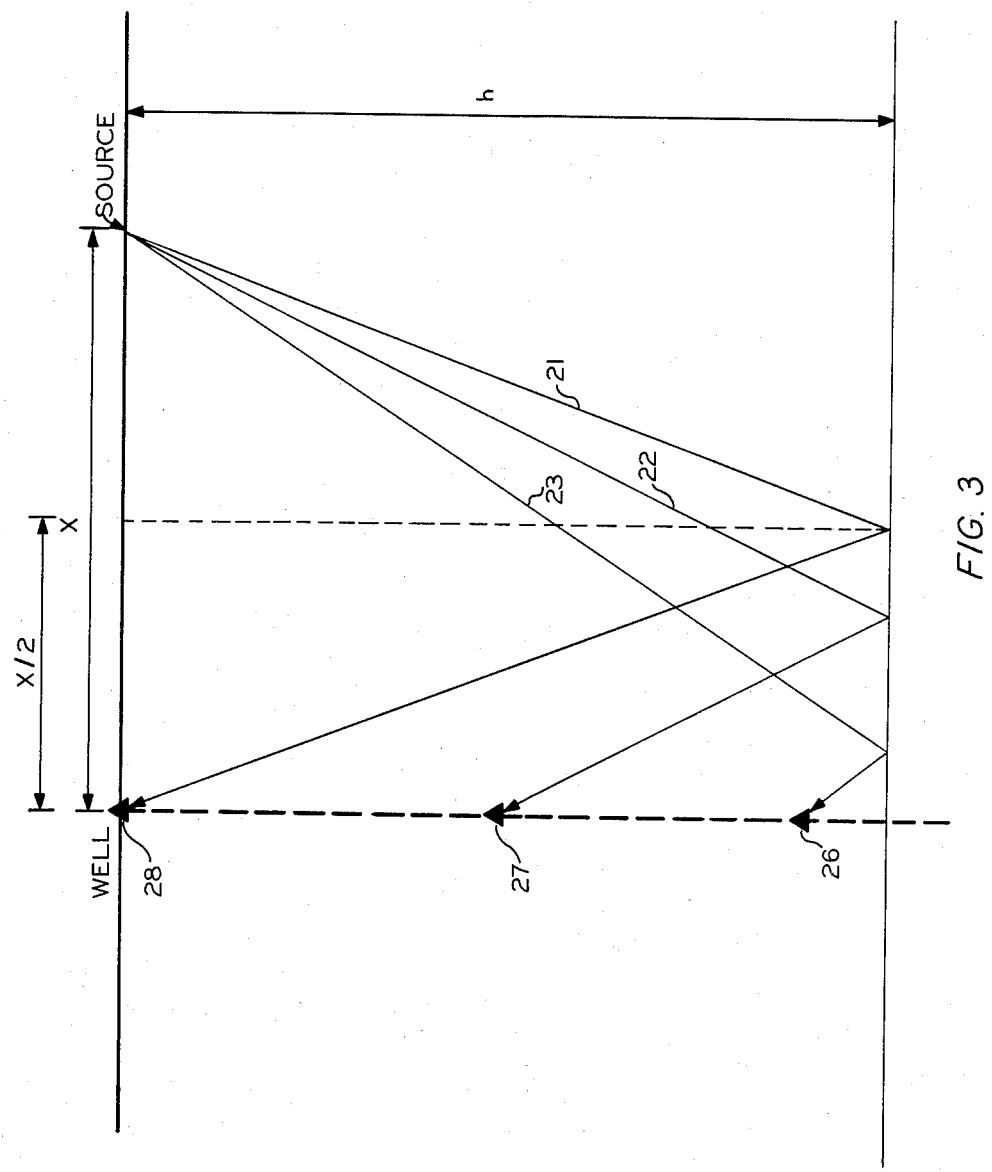
FIGS. 3, 4 and 5 are geometric illustrations utilized to derive the equations required to transform VSP seismic data into surface seismic data.
Figure 4:
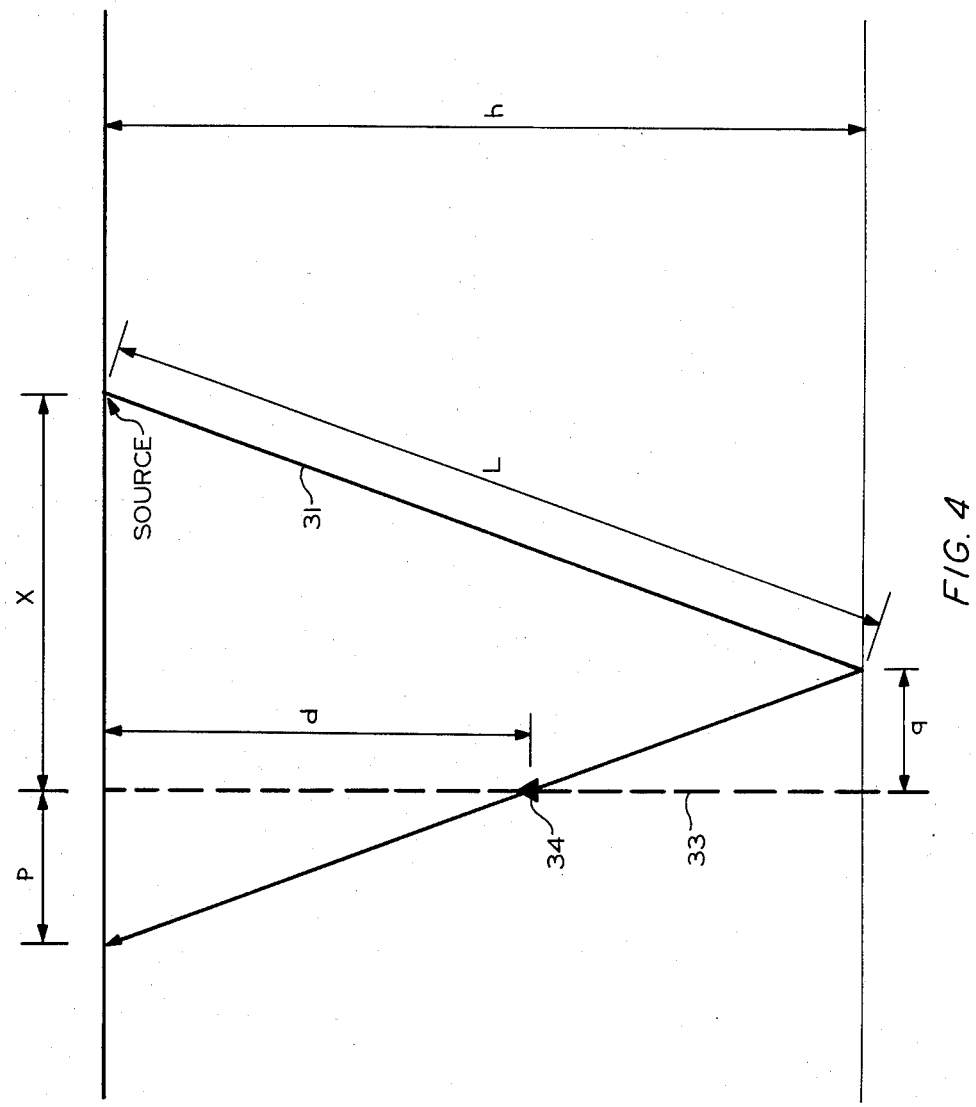
Figure 5:
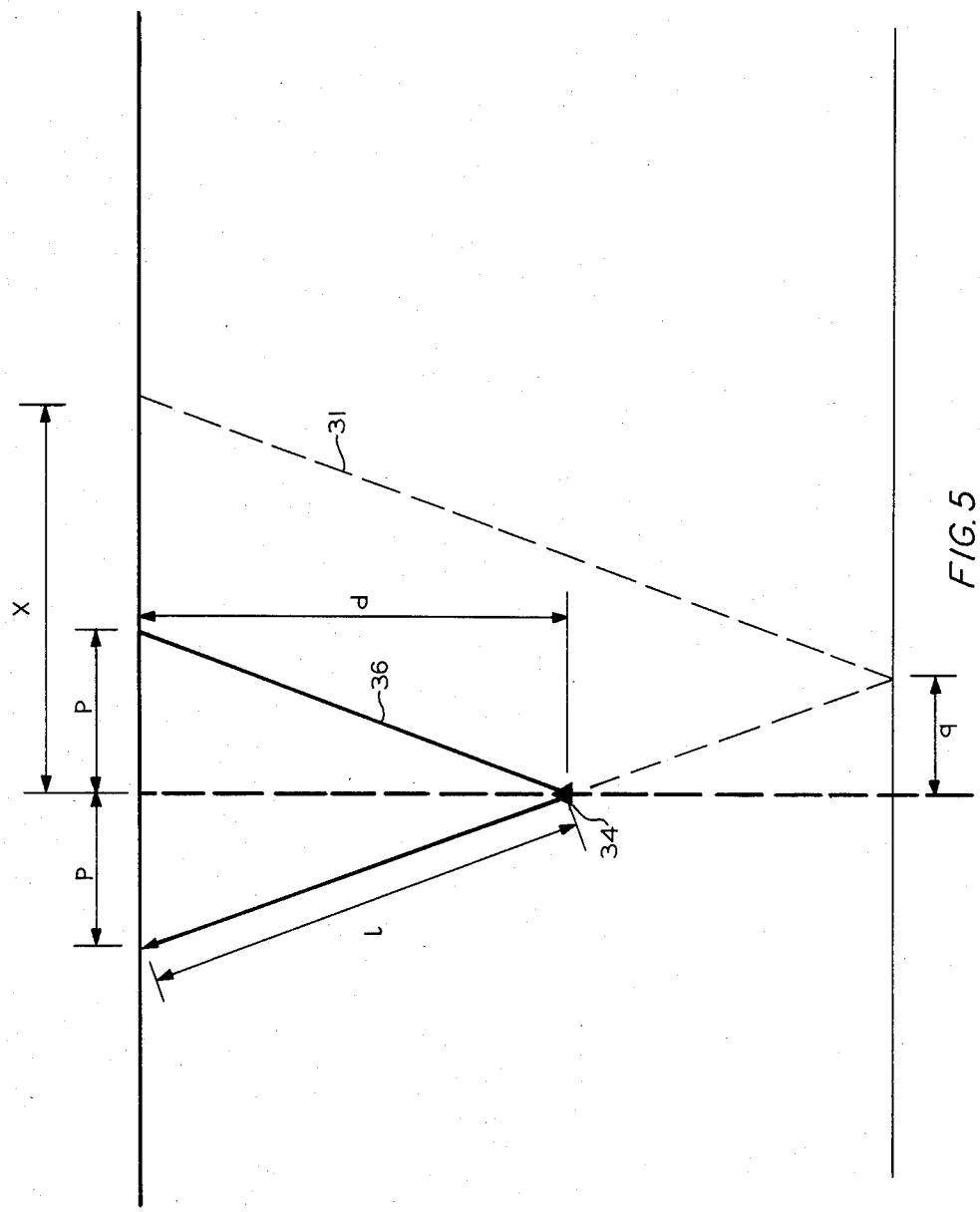

It is very difficult to determine subsurface structure from the VSP data illustrated in FIG. 2 because the data is not stacked and is not in the format generally worked with by exploration geophysicists who are typically knowledgeable in interpreting surface seismic data. The following mapping and stacking procedure is utilized to convert the VSP data illustrated in FIG. 2 to surface seismic data which has the appearance of conventional seismic data obtained using surface geophones and which can be more easily interpreted with respect to determining subsurface structure because the data is stacked and because the data is in a more conventional form. FIGS. 3, 4 and 5 will be utilized to illustrate the manner in which this conversion can be achieved.

Referring now to FIG. 3, three rays 21-23 are shown propagating from the source at offset X from the well down to a horizontal interface at a depth h and back up to the three borehole geophone stations 26-28. For the geophone 28, the signal recorded comes from a reflection point on the interface at a distance X/2 from the well. For the geophone 26, the signal received is from a reflection point which is considered essentially 0 distance from the well. For intermediate borehole geophone stations such as the station of geophone 27, the reflection points on the interface fall between distances of 0 and X/2 from the well.

For the configuration illustrated in FIG. 3, a number of locations could be located on the interface between 0 and X/2 which are referred to hereinafter as vertical seismic profile common depth points (VSPCDP). The number of VSPCDP locations is arbitrary as are their mutual distance from each other. For simplicity, a constant separation of 20 feet will be assumed between adjacent VSPCDP locations.

For any one of the VSPCDP locations such as the location 180 feet from the well, those pieces of the recorded VSP data which correspond to signals which had reflection points lying on the interface at depth h between 170 feet and 190 feet from the well (within half the VSPCDP spacing to either side of the VSPCDP location at 180 feet from the well) can be picked out. The times at which these pieces appear on their respective VSP traces (VSP time) can all be mapped into the two-way vertical travel time for this particular interface at depth h (surface seismic time). Once the proper mapping has been applied to the pieces, the pieces can be stacked together. The result is placed on a VSPCDP stack trace associated with the VSPCDP location at 180 feet from the well and at a time equal to the two-way vertical travel time to the reflector at depth h (surface seismic time for that reflector). Again, the stacking is made possible by the fact that the number of reflection points will be greater than the number of VSPCDP locations. As an example, for a source at offset 1000 feet, an interface at a depth of 5000 feet and a distance of 50 feet between adjacent borehole geophone locations, there will be more than 100 reflection points along the interface from the well out to a distance of 500 feet in the direction of the source. However, for the assumed 20 foot spacing, there will be only 25 VSPCDP locations.

FIG. 4 shows the VSP reflection geometry for the case of a horizontal layer located at a depth h. A downgoing straight ray 31 extends from the source at offset x to a reflection point at depth h and lateral distance q from the borehole 33. The pathlength along this straight ray is L. The upgoing reflected ray passes through the borehole geophone 34 located at depth d and strikes the surface at lateral distance p. Simple geometry gives the equation $$L^2 = h^2 + \left(\frac{x+p}{2}\right)^2. \tag{1}$$

If $T_{o,r}$ is defined as the surface seismic time or two-way vertical traveltime from the surface to the reflection point, $V(T_{o,r})$ is defined as the average velocity from the surface down to the reflection point and $t_r$ is defined as the two-way traveltime along the straight raypath 31 shown in FIG. 4, then $$L = \frac{t_r V(T_{o,r})}{2} \quad (2)$$

and $$h = \frac{T_{o,r} V(T_{o,r})}{2}. \quad (3)$$

Substituting equations (2) and (3) into equation (1) and rearranging gives the familiar hyperbolic moveout equation, $$t_r^2 = T_{o,r}^2 + \left(\frac{x+p}{V(T_{o,r})}\right)^2. \quad (4)$$

Similar triangles give $$\frac{p}{d} = \frac{x+p}{T_{o,r} V(T_{o,r})}, \quad (5)$$

Equation 5 can be rearranged to give $$p = \frac{xd}{T_{o,r} V(T_{o,r}) - d}. \quad (6)$$

Substituting equation (6) into equation (4) and taking the square root gives $$t_r = T_{o,r} \left[1 + \left(\frac{x}{T_{o,r} V(T_{o,r}) - d}\right)^2\right]^{\frac{1}{2}}, \quad (7)$$

which is the total traveltime from the source to the reflection point and back up to the surface along the straight raypath 31 shown. The VSP reflection event time ($t_{VSP}$) which is generally referred to herein as VSP time will be the difference between $t_r$ and the traveltime from the borehole geophone location up to the surface along the raypath 31.

In FIG. 5, a straight raypath 36, which could correspond to a reflection if a source were at lateral distance p from the well and if there were a horizontal interface at the depth d, is illustrated. The pathlength along the upgoing part of the raypath is 1. The traveltime along this upgoing portion is the time we need to subtract from $t_r$ to get $t_{VSP}$.

Simple geometry gives the equation $$l^2 = d^2 + p^2 \quad (8)$$

If $T_{o,d}$ is defined as the two-way vertical traveltime from the surface of the geophone depth (d), $V(T_{o,d})$ is defined as the average velocity from the surface down to the borehole geophone 34 location, and $t_d$ is defined as the two-way traveltime along the raypath 36, then $$l = \frac{t_d V(T_{o,d})}{2} \quad (9)$$

and $$d = \frac{T_{o,d} V(T_{o,d})}{2}. \quad (10)$$

Substituting equations (9) and (10) into equation (8) gives $$t_d^2 = T_{o,d}^2 + \left(\frac{2p}{V(T_{o,d})}\right)^2. \quad (11)$$

Substituting for p from equation (6) and using equation (10) gives $$t_d = T_{o,d} \left[1 + \left(\frac{x}{T_{o,r} V(T_{o,r}) - d}\right)^2\right]^{\frac{1}{2}} \quad (12)$$

Since $t_d/2$ is the traveltime along the upgoing part of the raypath 36, the VSP time ($t_{VSP}$) becomes $$t_{vsp} = t_r - t_d/2 = (T_{o,r} - \tfrac{1}{2} T_{o,d}) \left[1 + \left(\frac{x}{T_{o,r} V(T_{o,r}) - d}\right)^2\right]^{\frac{1}{2}} \quad (13)$$

Using equation (10) again, equation (13) can be rewritten as $$t_{vsp} = (T_{o,r} - \tfrac{1}{2} T_{o,d}) \left[1 + \left(\frac{x}{T_{o,r} V(T_{o,r}) - \tfrac{1}{2} T_{o,d} V(T_{o,d})}\right)^2\right]^{\frac{1}{2}} \quad (14)$$

Equations (13) and (14) map $t_{VSP}$, the VSP time on the VSP trace recorded by the borehole geophone located at depth d, to the surface seismic time or the two-way vertical traveltime $T_{o,r}$ for the corresponding reflector which produced the event.

The lateral position of the reflection point for this event (q) can be determined from the relationship $$p + q = \frac{x+p}{2} \quad (15)$$

Using equation (6) and solving for q gives $$q = x \left(\frac{T_{o,r} V(T_{o,r}) - 2d}{2T_{o,r} V(T_{o,r}) - 2d}\right) \quad (16)$$

or substituting for d from equation (10) gives $$q = x \left(\frac{T_{o,r} V(T_{o,r}) - T_{o,d} V(T_{o,d})}{2T_{o,r} V(T_{o,r}) - T_{o,d} V(T_{o,d})}\right) \quad (17)$$

Using the above equations, the VSPCDP stack can be performed on VSP data such as that illustrated in FIG. 2. However, in order to better illustrate the present invention, the VSPCDP stack will be described in terms of the synthetic VSP data illustrated in FIG. 6.

Figure 6:
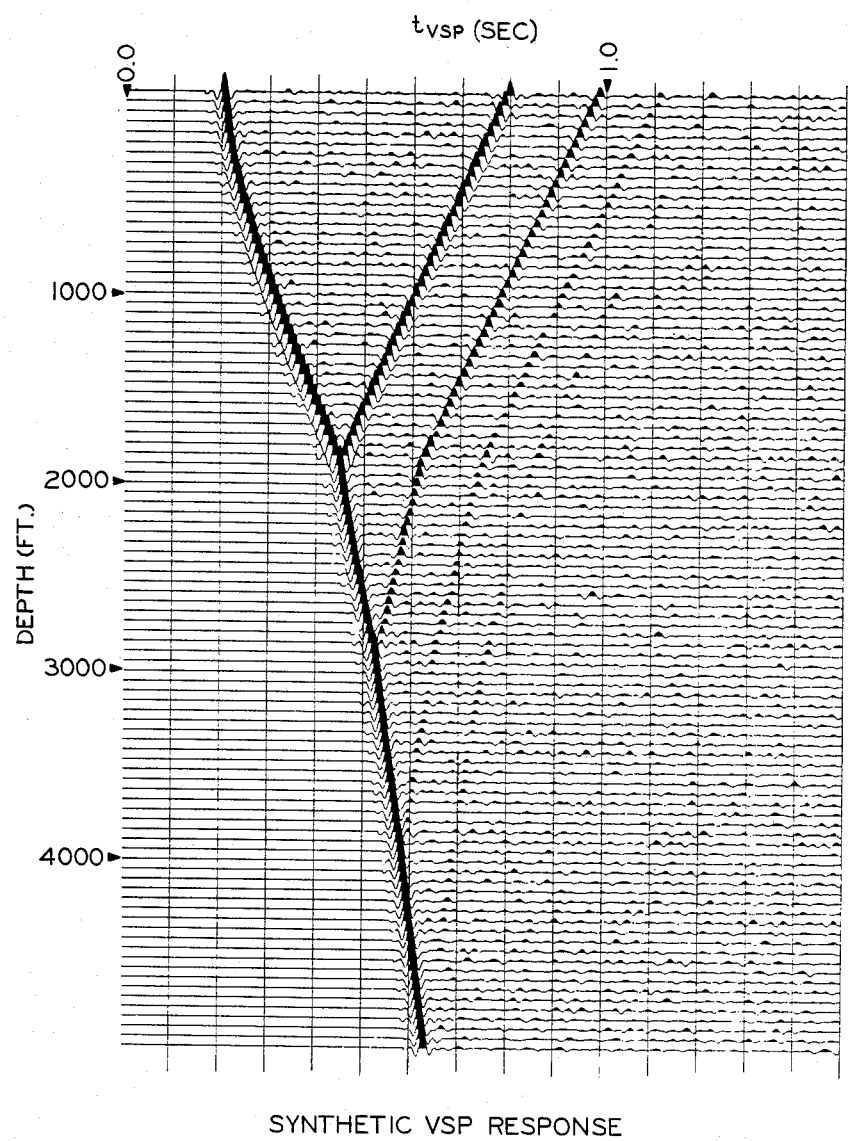
FIG. 6 is an illustration of a synthetic VSP response.

The synthetic VSP data illustrated in FIG. 6 was derived for four horizontal homogeneous layers with each deeper layer having a higher velocity. The layers were located at 2000 feet, 3000 feet, 4000 feet and 5000 feet. The velocity between the surface and 2000 feet was 5000 feet per second, the velocity between 2000 feet and 3000 feet was 10,000 feet per second, the velocity between 3000 feet and 4000 feet was 15,000 feet per second, the velocity between 4000 feet and 5000 feet was 18,000 feet per second and the velocity below 5000 feet was 20,000 feet per second. The source was offset 1000 feet from the well and the borehole geophone is located at stations every 50 feet between 150 feet and 4950 feet. Random noise has been added to the synthetic data.

Figure 7:
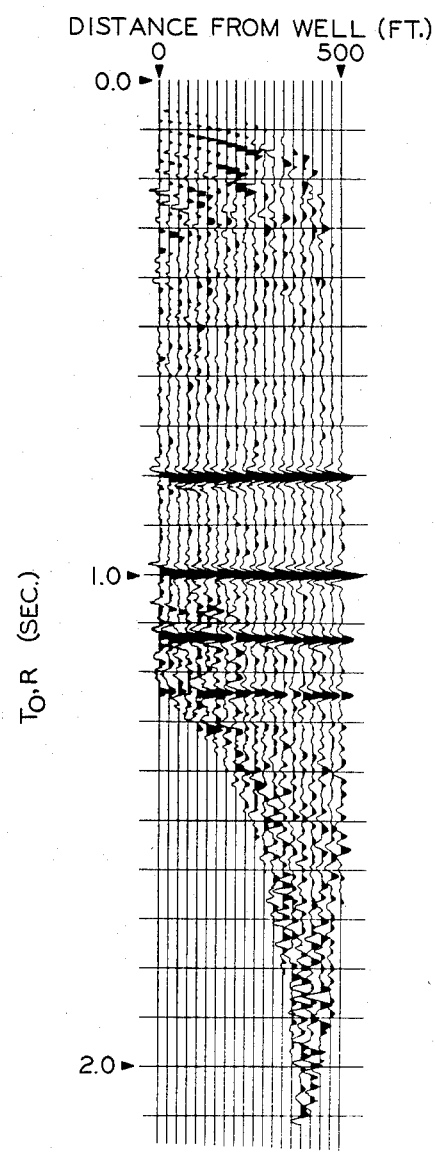
FIG. 7 is an illustration of surface seismic data obtained by transforming the synthetic VSP response illustrated in FIG. 6 in accordance with the present invention.

The following steps are utilized to convert the synthetic VSP response, illustrated in FIG. 6, to the VSPCDP stack illustrated in FIG. 7 which presents the seismic data in a conventional stacked form:

1. Specify a number of VSPCDP locations between the well and the lateral distance X/2 along the direction towards the source. These locations would typically be separated from each other by a constant lateral spacing of D. A VSPCDP stack trace is associated with each location as has been previously stated. For the VSPCDP stack illustrated in FIG. 7, the spacing (D) was 25 feet, the first trace is at 12.5 feet and the last trace is at 487.5 feet from the well.

2. Choose a VSP data trace from the VSP data illustrated in FIG. 6. This is accomplished by choosing a depth where a geophone was located such as 500 feet, 1000 feet, 1200 feet, etc. This choice determines the value of d which will correspond to the depth of the geophone. $T_{o,d}$ can be calculated based on the first break time ($t_f$) taken from the VSP response illustrated in FIG. 6. As an example, for the VSP trace at 2000 feet, the first break time is approximately 0.4 seconds. This time is related to $T_{o,d}$ by the equation $$\frac{T_{o,d}}{d} = \frac{t_f}{y} \qquad (18)$$

and y is the direct distance between the source and the geophone. Since d, y and $t_f$ are known, equation (18) can be solved for $T_{o,d}$.

Once $T_{o,d}$ is known, equation (10) can be solved for $V(T_{o,d})$.

3. Choose a value for $T_{o,r}$. This gives a location on the VSPCDP stack illustrated in FIG. 7. Also, $V(T_{o,r})$ can be determined based on the chosen value of $T_{o,r}$. This is generally accomplished by calculating a plurality of values for $T_{o,d}$ and $V(T_{o,d})$ from the VSP response illustrated in FIG. 6. Since $T_{o,d}$ and $T_{o,r}$ would be equal for the same depth, the value of $V(T_{o,r})$ for any particular $T_{o,r}$ can be determined by finding the value of $T_{o,d}$ which corresponds to the chosen value of $T_{o,r}$ and $V(T_{o,r})$ will be equal to $V(T_{o,d})$ for that particular value.

4. Calculate a value of $t_{VSP}$ using equation (14) and a value for q using equation (17).

5. Take the data sample at time $t_{VSP}$ on the VSP data trace chosen and place it at time $T_{o,r}$ on the VSPCDP stack trace associated with the location K for which equation (19) is satisfied.

$$|q - VSPCDP_K| < \frac{D}{2} \qquad (19)$$

As an example, the calculated q might be 106 feet. For a D of 20 feet, the VSPCDP location which satisfies equation (19) would be 100 feet assuming a constant lateral spacing of the VSPCDP locations.

6. Sum together samples which accumulate at the same value of $T_{o,r}$ on a given VSPCDP stack trace.

7. Repeat steps 3–6 for all desired values of $T_{o,r}$ for the VSPCDP stack illustrated in FIG. 7. A typical increment for $T_{o,r}$ is 1 millisecond.

8. Repeat steps 2–7 for all VSP traces illustrated in FIG. 6.

Essentially, steps 3, 4 and 5 are a mapping of VSP data at a VSP time ($t_{VSP}$) into surface seismic data at the surface seismic time ($T_{o,r}$) chosen in step 3 such that a data sample or segment of the VSP data at the VSP time is moved onto a position on the surface seismic data illustrated in FIG. 7 which position is determined by the surface seismic time ($T_{o,r}$) and the distance between the reflection point and the borehole (q). Step 7 is a repeat of this mapping function for different surface seismic times. Step 6 is a summing or a stacking of samples or sections which accumulate at the same location in FIG. 7. Step 8 is a repeat of the mapping and stacking for the remaining VSP traces to form the complete surface seismic data illustrated in FIG. 7.

Again, FIG. 7 may be considered a plot of surface seismic time as a function of distance from the borehole. The data samples or sections in step 5 are thus placed on a plot of surface seismic time as a function of distance from the borehole. When the procedure is completed, the plot is the total surface seismic data.

Figure 8:
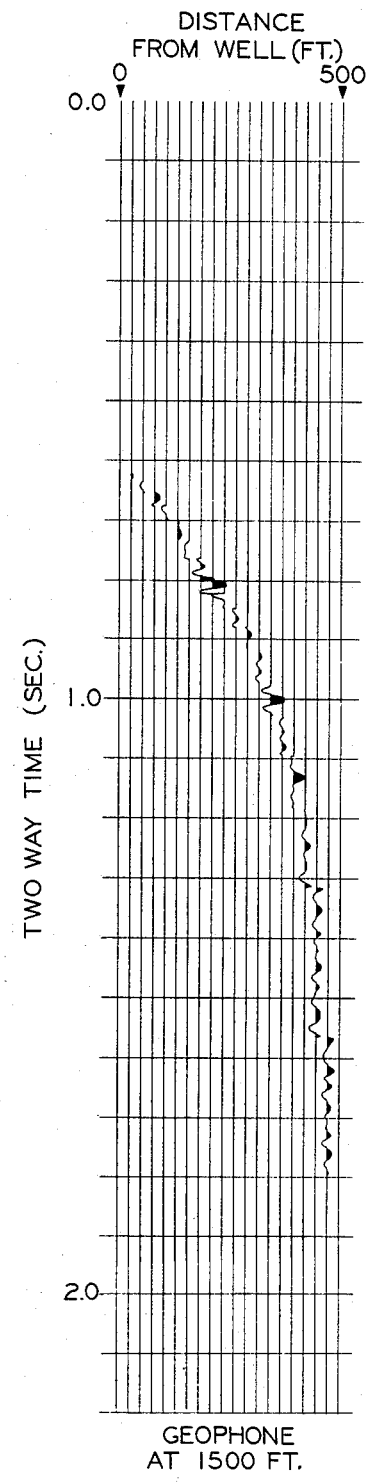
FIGS. 8 and 9 are illustrations of applying the transformation technique of the present invention to single VSP data traces in the synthetic VSP response illustrated in FIG. 6.
Figure 9:
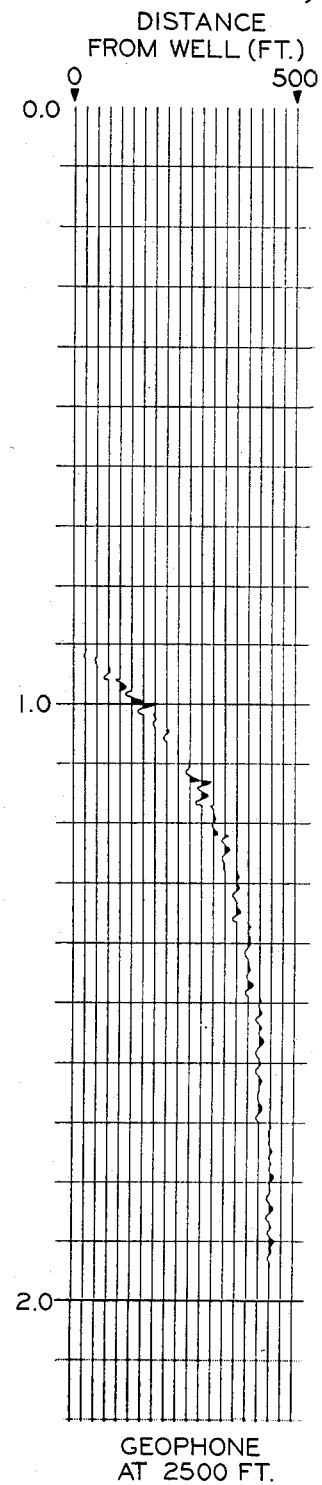

FIG. 8 illustrates the result of applying steps 1–7 to the single VSP trace recorded at 1500 feet. FIG. 9 shows the results of applying steps 1–7 to the single VSP trace recorded at 2500 feet. As can be seen, the data on a single VSP trace is distributed to a number of VSPCDP traces by the VSPCDP stacking procedure. Again, FIG. 7 is a result of stacking all individual traces.

The description of the invention to this point has centered around the simple case where the borehole is vertical and the reflecting interface is horizontal. Modifications must be made if the borehole is not vertical or if the horizontal reflector is not horizontal. For the case of a deviated well, the changes are simple and do not make the mapping and stacking procedure any more difficult.

Considering the case where the deviated well forms a two-dimensional curve and the source is in the plane of the curve, the geophone locations along the deviated well will no longer have the same lateral position. In this case, it is preferred to measure the lateral distances from the constant source position rather than from the variable geophone locations. Equations (13), (14), (16) and (17) can be modified to reflect this change in origin from well to source by replacing the constant x by the variable y(d), where y(d) is the lateral distance from the source to the borehole geophone at depth d. The modified versions of equations (13), (14), (16) and (17) are given by $$t_{vsp} = (T_{o,r} - \tfrac{1}{2}T_{o,d})\left[1 + \left(\frac{y(d)}{T_{o,r}V(T_{o,r}) - d}\right)^2\right]^{\frac{1}{2}}, \qquad (20)$$

$$t_{vsp} = (T_{o,r} - \tfrac{1}{2}T_{o,d})\left[1 + \left(\frac{y(d)}{T_{o,r}V(T_{o,r}) - \tfrac{1}{2}T_{o,d}V(T_{o,d})}\right)^2\right]^{\frac{1}{2}} \qquad (21)$$

$$q = y(d)\left(\frac{T_{o,r}V(T_{o,r}) - 2d}{2T_{o,r}V(T_{o,r}) - 2d}\right), \qquad (22)$$

-continued and $$q = y(d)\left(\frac{T_{o,r}V(T_{o,r}) - T_{o,d}V(T_{o,d})}{2T_{o,r}V(T_{o,r}) - T_{o,d}V(T_{o,d})}\right) \text{ respectively.} \quad (23)$$

The modified versions of equations (16) and (17) still give the lateral distance between the borehole geophone at depth d and the reflection points. If s is the lateral distance from the source to the reflection points, then $$s = y(d) - q. \quad (24)$$

Substituting equation (22) for q in equation (24) gives $$s = y(d)\left(\frac{T_{o,r}V(T_{o,r})}{2T_{o,r}V(T_{o,r}) - 2d}\right) \quad (25)$$

Substituting equation (23) for q in equation (24) gives $$s = y(d)\left(\frac{T_{o,r}V(T_{o,r})}{2T_{o,r}V(T_{o,r}) - T_{o,d}V(T_{o,d})}\right). \quad (26)$$

If the borehole has been surveyed, either equations (20) and (25) or equations (21) and (26) can be used to perform the VSPCDP stack by the method described above for a vertical borehole.

When dipping beds are present, the reflection points will not occur in the same locations as they would for horizontal reflectors. In fact, the location of the reflection points may not even lie between the borehole and half the distance out to the source as in the usual VSPCDP stack. Therefore, in the case of dipping reflectors, it is necessary to migrate the reflection points to their actual lateral positions with respect to the borehole.

Figure 10:
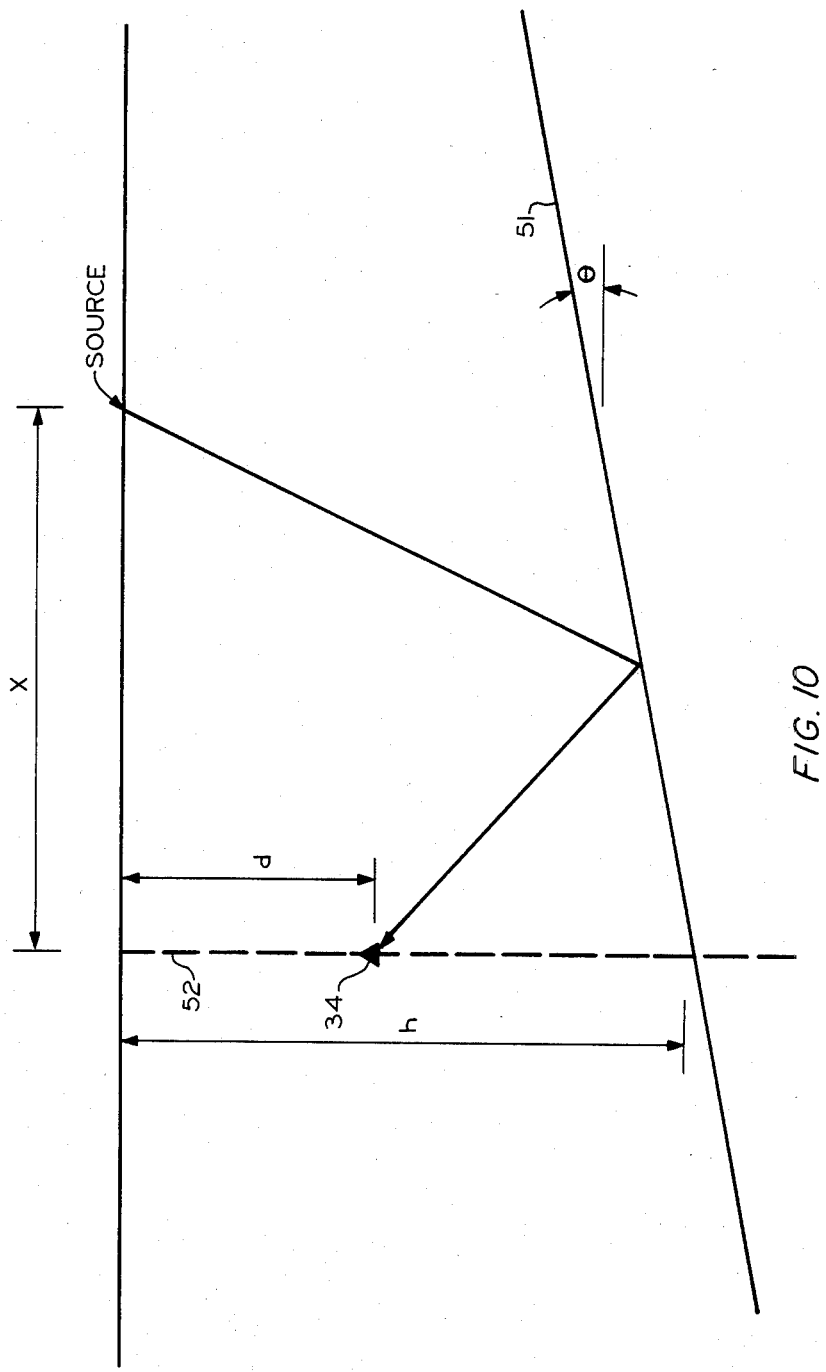
FIGS. 10 and 11 are geometric representations utilized to derive the equations required for applying the transformation of the present invention where dipping reflectors are present.

For example, FIG. 10 shows a reflector 51 which dips at an angle of $\theta$ degrees and intercepts the well 52 at depth h. The source is offset a distance x feet from the well 52 and the borehole geophone 34 is at depth d As in the VSPCDP stack previously described, the objective is to calculate the actual location of the reflection point, the time that the reflection arrives at the borehole geophone 34, and the two-way vertical traveltime to the actual reflection point. Then the event on the VSP trace can be mapped into the migrated VSPCDP stack at both the correct time and the correct lateral position with respect to the well 52.

Figure 11:
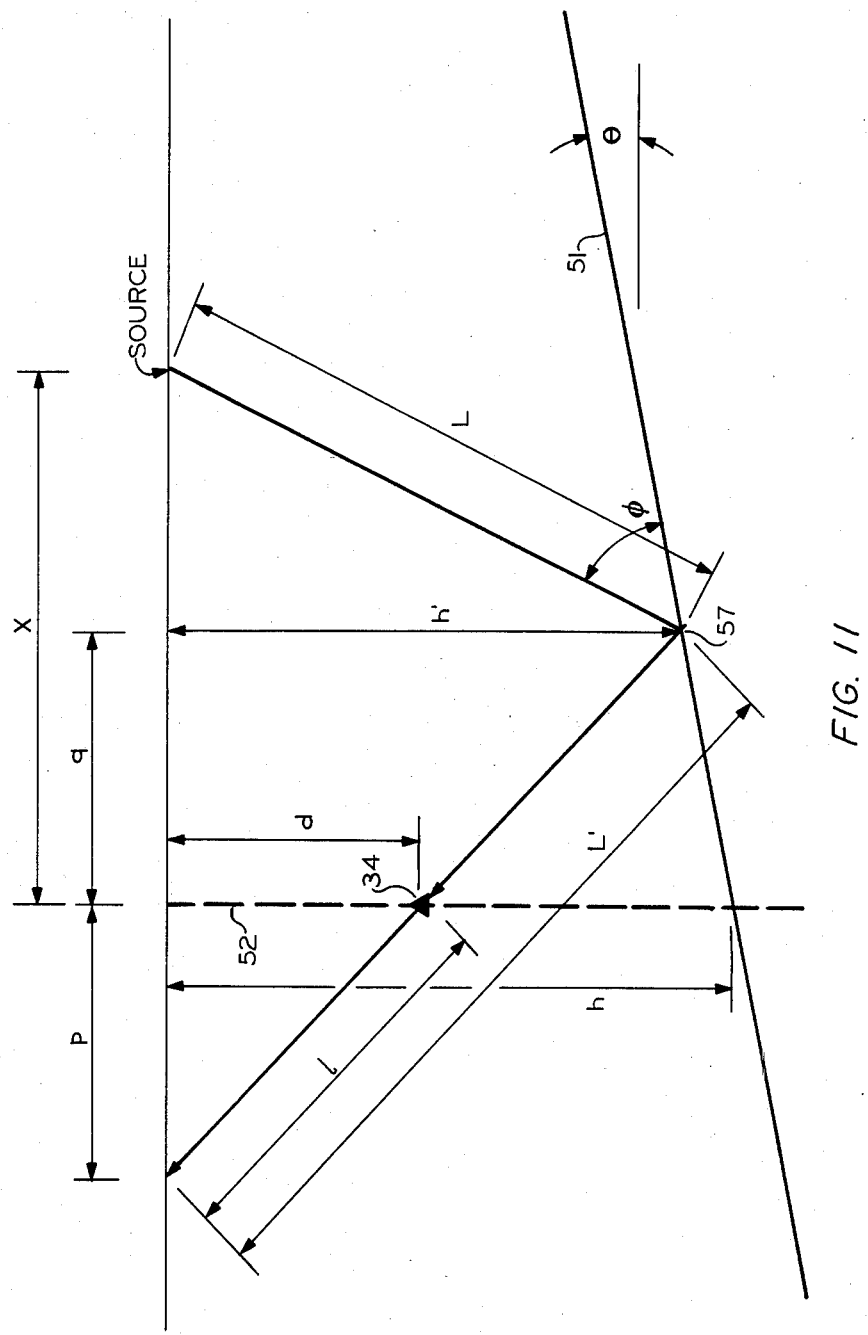

FIG. 11 shows the parameters needed to derive the VSPCDP migration equations. Using geometry, the angle $\phi$ between the reflector 51 and incident ray 56, the vertical distance h' to the reflection point 57, and the lateral distance q from the borehole 52 to reflection point 57 can be written, respectively, as $$\phi = \arctan\left[\frac{2h - x\tan\theta - d}{x + d\tan\theta}\right] \quad (27)$$

$$h' = h - q\tan\theta, \quad (28)$$

and $$q = \frac{-h + x\tan(\phi + \theta)}{\tan(\phi + \theta) - \tan\theta} \quad (29)$$

If the reflected ray is extended past the borehole 52 to a point on the surface which is a distance p from the well, then p can be written as $$p = d \cot(\phi - \theta) \quad (30)$$

The length L of the downgoing raypath between the source and the reflection point 57 can be written as $$L = \sqrt{h'^2 + (x - q)^2}. \quad (31)$$

The length L' of the upgoing raypath between the reflection point 57 and the surface can be written as $$L' = \sqrt{h'^2 + (q + p)^2}. \quad (32)$$

The length l of the portion of the upgoing raypath between the borehole geophone and the surface can be written as $$l = \sqrt{p^2 + d^2}. \quad (33)$$

If $T_{o,r}$ is again the two-way vertical traveltime and $V(T_{o,r})$ is again the average velocity down to the reflection point 57, then $$h' = \frac{T_{o,r}V(T_{o,r})}{2}. \quad (34)$$

If $t_r$ is the traveltime along the entire raypath from source to reflection point and back up to the surface, then the total pathlength can be approximated by $$L + L' \simeq t_r V(T_{o,r})$$

from which $$t_r \simeq \frac{L + L'}{V(T_{o,r})} \quad (36)$$

The VSP reflection time ($t_{VSP}$) will again be the difference between $t_r$ and the traveltime from the borehole geophone location up to the surface. If $t_d$ is the two-way traveltime along the raypath from the geophone 34 to the surface then $$l \simeq \frac{t_d V(T_{o,d})}{2} \quad (37)$$

from which $$t_d \simeq \frac{2l}{V(T_{o,d})} \quad (38)$$

where $V(T_{o,d})$ is again the average velocity down to the borehole geophone location. The VSP reflection event is given by $$t_{VSP} = t_r - \frac{t_d}{2} \quad (39)$$

Substituting equations (36) and (38) into (39) gives $$t_{VSP} = \frac{L + L'}{V(T_{o,r})} - \frac{1}{V(T_{o,d})} \quad (40)$$

Then substituting equations (31), (32), and (33) into (40) gives $$t_{VSP} = \frac{h'^2 + (x-q)^2 + h'^2 + (q+p)^2}{V(T_{o,r})} - \frac{p^2 + d^2}{V(T_{o,d})} \quad (41)$$

Using equations (27)–(41), a VSPCDP stack can be performed according to the following procedure:

1. Estimate the dip angle ($\theta$) by the technique described in Balch, A. H., Lee, M. W., and Muller, D., "A Vertical Seismic Profiling experiment to determine the depth and dip of the Paleozoic surface at drill hole U10bd, Nevada Test Site: U.S. Geological Survey Open-File Report No. 80-847, 25pp, 1980.
2. Specify a number of VSPCDP locations. These locations should extend over a broader region than just between the well and half the source offset. These locations would again typically be separated from each other by a constant lateral spacing of D. A VSPCDP stack trace is associated with each location as has been previously stated.
3. Choose a VSP data trace. This is again accomplished by choosing a depth where a geophone was located such as 500 feet, 1000 feet, 1200 feet, etc. This choice determines the value of d which will correspond to the depth of the geophone. $T_{o,d}$ can again be calculated based on the first break time taken from the VSP response. Once $T_{o,d}$ is known, equation (10) can again be solved for $V(T_{o,d})$.
4. Choose a value for h which is greater than the chosen d. Essentially, a false assumption is being made that reflectors are located at periodic distances below d but this assumption allows the mapping to be accomplished by varying h. The choice of h determines an approximate value for $V(T_{o,r})$ since $V(T_{o,r})$ will be equal to $V(T_{o,d})$ where d=h and $V(T_{o,d})$ will be known for a plurality of depths (d) from the calculation of a plurality of values of $V(T_{o,d})$ as previously described.
5. Calculate a value of $\theta$ using equation (27), a value for q using equation (29) and a value of p using equation (30). Then calculate a value of h' using equation (28), a value of $T_{o,r}$ using equation (34) and finally a value for $t_{VSP}$ using equation (41).
6. Take the data sample at time $t_{vsp}$ on the VSP data trace chosen and place it at time $T_{o,r}$ on the VSPCDP stack trace associated with the location K for which equation (19) is satisfied as previously described.
7. Sum together samples which accumulate at the same value of $T_{o,r}$ on a given VSPCDP stack trace.
8. Repeat steps 4–7 for all desired values of h. A typical increment for h is 5 feet.
9. Repeat steps 3–8 for all VSP data traces.

Again, steps 4, 5 and 6 are the mapping of a segment of the chosen VSP data trace for the calculated VSP time ($t_{vsp}$) into the surface seismic data at the calculated surface seismic time ($T_{o,r}$). Step 8 accomplishes the mapping for a plurality of segments of the chosen VSP data trace. Step 9 accomplishes the mapping for all VSP data traces. Step 7 accomplishes the stacking which results in the production of the surface seismic data from the VSP seismic data.

The preferred computer program for accomplishing steps 1–8 which transform VSP seismic data into surface seismic data for the case of a horizontal reflector which is substantially parallel to the surface is set forth in Appendix I. The preferred computer program for accomplishing steps 1–9 which convert VSP seismic data into surface seismic data for the case of a dipping horizontal layer is set forth in Appendix II. Both computer programs are written for the 2100 Series computer manufactured by Hewlett-Packard and are self-explanatory to one skilled in the use of the 2100 Series computer. The input required into the computer programs is VSP seismic data such as that illustrated in FIG. 2 and the first break time for each geophone trace.

The invention has been described in terms of a preferred embodiment. A number of variations are possible especially with respect to the exact steps utilized to perform the mapping of the present invention. Such variations are within the scope of the present invention.

APPENDIX I

```
&STACK T=00004 IS ON CR00024 USING 00046 BLKS R=0000

0001    FTN4,L
0002    $EMA(KAY,0)
0003            PROGRAM STACK
0004    C
0005    C       <04-81, KDW>
0006    C
0007    C       PROGRAM TO CALCULATE THE "VSPCDP STACK" SECTION FROM THE
0008    C       UNALIGNED UPGOING EVENTS OF THE VSP.
0009    C
0010    C*********************************************************
0011    C
0012    C       VARIABLES USED IN PROGRAM "STACK"
0013    C
0014    C       LIST    - LOGICAL UNIT OF DEVICE TO LIST DATA TO
0015    C       MAGIN   - MAG TAPE LU TO READ VSP UPGOING TRACES FROM
0016    C       G1      - DEPTH OF THE SHALLOWEST GEOPHONE TRACE
```

```
0017  C        G2       - DEPTH OF THE DEEPEST GEOPHONE TRACE
0018  C        GI       - DISTANCE BETWEEN GEOPHONES
0019  C        NG       - TOTAL NUMBER OF GEOPHONES
0020  C        ISP1     - SHOTPOINT NUMBER OF GEOPHONE TRACE AT "G1"
0021  C        ISP2     - SHOTPOINT NUMBER OF GEOPHONE TRACE AT "G2"
0022  C        ISPI     - SHOTPOINT INCREMENT BETWEEN GEOPHONE TRACES
0023  C        IDSH     - DASH NUMBER FOR VSP UPGOING TRACES
0024  C        IMC      - MULT CODE NUMBER FOR VSP UPGOING TRACES
0025  C        NPTS     - NUMBER OF POINTS FOR VSP UPGOING TRACES
0026  C        ISR      - SAMPLE RATE (MS) FOR VSP UPGOING TRACES
0027  C        NGE      - NUMBER OF GEOPHONES TRACES TO ELIMINATE (NOISY)
0028  C        NOPHON   - ARRAY WHICH CONTAINS WHICH GEOPHONES TO ELIMINATE
0029  C        IFILE    - FILE LOCATION CONTANING FIRST BREAKS
0030  C        IBLK     - BLOCK NUMBER IN IFILE WHERE FIRST BREAKS ARE LOCATED
0031  C        GF       - DEPTH OF THE FIRST GEOPHONE LOCATION IN "IFILE"
0032  C        IFB      - ARRAY CONTAINING THE FIRST BREAKS FOR GEOPHONES
0033  C                   STARTING AT G1FB
0034  C        IFBC     - ARRAY CONTAINING THE FIRST BREAKS THAT ARE CORRECTED
0035  C                   FOR ZERO OFFSET FOR GEOPHONES STARTING AT G1FG
0036  C        VEL      - AVERAGE VELOCITY OF EARTH BELOW TD
0037  C        DVEL     - DATUM VELOCITY
0038  C        XS       - SOURCE OFFSET
0039  C        MAGOT    - MAG TAPE LU TO WRITE "VSPCDP" TRACES TO
0040  C        NTR      - NUMBER OF "VSPCDP" TRACES TO OUTPUT TO TAPE
0041  C        LSR      - SAMPLE RATE OF "VSPCDP" TRACES
0042  C        KPTS     - NUMBER OF POINTS IN "VSPCDP" TRACES
0043  C        ISPO     - OUTPUT SHOTPOINT FOR "VSPCDP" TRACES
0044  C        CDP      - ARRAY CONTAINING DISTANCE FROM WELL FOR EACH "VSPCDP" TRACE
0045  C        BOUND    - ARRAY CONTAINING THE BOUNDS OVER WHICH ALL REFLECTIONS
0046  C                   ARE STACKED FOR EACH "VSPCDP" TRACE
0047  C        ISVD     - ARRAY CONTAINING THE STACKING VELOCITY AT EACH GEOPHONE
0048  C                   TRACE LOCATION (1 TO NG)
0049  C        ISV      - ARRAY CONTAINING THE STACKING VELOCITY AT EACH TIME
0050  C                   INCREMENT (1 TO KPTS)
0051  C        ID       - ARRAY CONTAINING THE DEPTH AT EACH TIME INCREMENT (1 TO KPTS)
0052  C
0053  C***********************************************************************
0054  C
0055         DIMENSION ID(2000),ISV(2000),BOUND(20,2),X(2000)
0056         DIMENSION IFBC(256),ISVD(256),IDCB(144),IFILE(5)
0057         DIMENSION NOPHON(100),IFB(256),GG(3),CDP(20)
0058         COMMON /KAY/ BUF(2000,20),IDUM(1000,20)
0059         CALL RMPAR(ID)
0060         LOUT=ID(2)
0061         WRITE(1,4)
0062       4 FORMAT("LIST DEVICE?  <")
0063         READ(1,*) LIST
0064         WRITE(1,5)
0065       5 FORMAT("MAG TAPE INPUT FOR UPGOING EVENTS?  <")
0066         READ(1,*) MAGIN
0067         WRITE(1,8)
0068       8 FORMAT("GEOPHONE START, STOP, INCREMENT?  <")
0069         READ(1,*) G1,G2,GI
0070         ISP1=G1
0071         ISP2=G2
0072         ISPI=GI
0073         WRITE(1,10)
0074      10 FORMAT("SHOT POINT START, STOP, INCREMENT?  <")
0075         READ(1,*) ISP1,ISP2,ISPI
0076         WRITE(1,11)
0077      11 FORMAT("NO. OF GEOPHONES TO ELIMINATE?  <")
0078         READ(1,*) NGE
0079         CALL VINIT(NOPHON,0,100)
0080         IF(NGE.EQ.0) GO TO 13
0081         WRITE(1,12)
0082      12 FORMAT("GEOPHONES TO ELIMINATE?  <")
0083         READ(1,*) (NOPHON(I),I=1,NGE)
```

```
0084        13 WRITE(1,14)
0085        14 FORMAT("DASH NO. AND MULT CODE OF VSP UPGOING TRACES?  <")
0086           READ(1,*) IDSH,IMC
0087           WRITE(1,114)
0088       114 FORMAT("TRACE NUMBER?  <")
0089           READ(1,*) ITR
0090        15 WRITE(1,20)
0091        20 FORMAT("NUMBER OF POINTS IN VSP UPGOING TRACES?  <")
0092           READ(1,*) NPTS
0093           IF(NPTS.GT.2000) GO TO 15
0094           WRITE(1,30)
0095        30 FORMAT("SAMPLE RATE OF VSP UPGOING TRACES (IN MILLISECONDS)?  <")
0096           READ(1,*) ISR
0097           WRITE(1,40)
0098        40 FORMAT("FOR FIRST BREAK TIMES, ENTER <")
0099           CALL GETFI(IFILE,1)
0100           WRITE(1,45)
0101        45 FORMAT("BLOCK NUMBER FOR FIRST BREAK TIMES?  <")
0102           READ(1,*) IBLK
0103           WRITE(1,46)
0104        46 FORMAT("FIRST AND LAST PHONE FOR  FIRST BREAKS?  <")
0105           READ(1,*) G1FB,G2FB
0106           GIFB=GI
0107           IF(G1.LT.G1FB) GO TO 9999
0108           IF(G2.GT.G2FB) GO TO 9999
0109           NG=(G2-G1)/GI+1
0110           NGG=(G2FB-G1FB)/GIFB+1
0111           CALL GETD(IDCB,IER,IFILE,IFILE(4),IFILE(5),IFB,NGG,IBLK,1,1)
0112           WRITE(1,60) G2FB
0113        60 FORMAT("AVERAGE VELOCITY OF EARTH BELOW PHONE AT",F5.0,"?  <")
0114           READ(1,*) VEL
0115           WRITE(1,61)
0116        61 FORMAT("NEAR SURFACE VELOCITY?  <")
0117           READ(1,*) DVEL
0118           WRITE(1,70)
0119        70 FORMAT("SOURCE OFFSET?  <")
0120           READ(1,*) XS
0121        75 WRITE(1,80)
0122        80 FORMAT("FOR OUTPUT VSPCDP TRACES, ENTER START POSITION"
0123          +"  STOP POSITION, AND INCREMENT"/
0124          +"  (ALL POSITIONS ARE RELATIVE TO WELL.  NEGATIVE POSITION"/
0125          +"  IS DOWNDIP FROM WELL, AND POSITIVE POSITION IS UPDIP)  <")
0126           READ(1,*) CDP1,CDP2,CDPI
0127           NTR=(CDP2-CDP1)/CDPI+1
0128           IF(NTR.GT.20) GO TO 75
0129           IF(NTR.GT.20) GO TO 75
0130           WRITE(1,84)
0131        84 FORMAT("SAMPLE RATE OF OUTPUT DATA?  <")
0132           READ(1,*) LSR
0133        85 WRITE(1,90)
0134        90 FORMAT("NO. OF OUTPUT PTS?  <")
0135           READ(1,*) KPTS
0136           IF(KPTS.GT.2000) GO TO 85
0137           WRITE(1,95)
0138        95 FORMAT("MAG TAPE LU OUT?  <")
0139           READ(1,*) MAGOT
0140           WRITE(1,96)
0141        96 FORMAT("OUTPUT SHOTPOINT?  <")
0142           READ(1,*) ISPO
0143     C
0144     C     WRITE PROGRAM PARAMETERS ON PRINTER
0145     C
0146           WRITE(LIST,1010) G1,G2,GI,NPTS,ISR,VEL,DVEL,XS,NTR,KPTS,
0147          + LSR,ISPO
0148      1010 FORMAT(" GEOPHONE START             =",F10.1/
0149          +       " GEOPHONE STOP              =",F10.1/
0150          +       " GEOPHONE INCREMENT         =",F10.1/
```

```
0151        +       "  NO. INPUT PTS              =",I10/
0152        +       "  INPUT SAMPLE RATE          =",I10/
0153        +       "  AVERAGE VELOCITY BELOW TD  =",F10.1/
0154        +       "  NEAR SURFACE VELOCITY      =",F10.1/
0155        +       "  SOURCE OFFSET              =",F10.1/
0156        +       "  NUMBER OF VSPCDP TRACES    =",I10/
0157        +       "  NO. OUTPUT PTS             =",I10/
0158        +       "  OUTPUT SAMPLE RATE         =",I10/
0159        +       "  OUTPUT SHOT POINT          =",I10/)
0160            IF(NGE.GT.0) WRITE(LIST,1020) NGE
0161       1020 FORMAT(" THE FOLLOWING",I5," GEOPHONES WERE ELIMINATED:")
0162            IF(NGE.GT.0) WRITE(LIST,1030) (NOPHON(I),I=1,NGE)
0163       1030 FORMAT(20X,I6)
0164      C
0165      C-----CALCULATE STACKING VELOCITIES AND DEPTHS
0166      C
0167      C-----IFB(256) ARE FIRST BREAKS FOR EVERY PHONE LOCATION WITH SOURCE OFFSET
0168      C-----IFBC(256) ARE FIRST BREAKS FOR EVERY PHONE CORRECTED TO ZERO OFFSET
0169      C-----ID(2000) IS DEPTH AS A FUNCTION OF VSPCDP REFLECTION TIME
0170      C-----ISV(2000) STACKING VELOCITY AS A FUNCTION OF VSPCDP REFLECTION TIME
0171      C-----ISVD(256) STACKING VELOCITIES FOR EVERY PHONE LOCATION
0172      C
0173      C
0174            DO 110 I=1,NGG
0175            D=G1FB+(I-1)*GIFB
0176            DD=SQRT(D*D+XS*XS)
0177            ISVD(I)=DD*1000./IFB(I)
0178        110 IFBC(I)=D*1000./ISVD(I)
0179            DEPTH=VEL*LSR/2000.
0180            DO 140 I=1,KPTS
0181            ITIME=I*LSR/2.
0182            DO 115 J=1,NGG
0183            IF(ITIME.LE.IFBC(J)) GO TO 116
0184        115 CONTINUE
0185            GO TO 130
0186        116 T1=IFBC(J-1)
0187            T2=IFBC(J)
0188            D1=G1FB+(J-2)*GIFB
0189            D2=G1FB+(J-1)*GIFB
0190            V1=ISVD(J-1)
0191            V2=ISVD(J)
0192            IF(J.GT.1) GO TO 120
0193            T1=0.
0194            D1=0.
0195            V1=DVEL
0196        120 ID(I)=D1+(D2-D1)*(ITIME-T1)/(T2-T1)
0197            ISV(I)=V1+(V2-V1)*(ITIME-T1)/(T2-T1)
0198            GO TO 135
0199        130 ID(I)=ID(I-1)+DEPTH
0200            SAVE=ID(I)*1000./ITIME
0201            ISV(I)=SAVE
0202        135 CONTINUE
0203        140 CONTINUE
0204      C
0205      C-----CALCULATE BOUNDS (XP1 AND XP2) FOR EACH OUTPUT TRACE
0206      C
0207            BINC=CDPI/2.
0208            DO 250 I=1,NTR
0209            BMID=CDP1+(I-1)*CDPI
0210            CDP(I)=BMID
0211            BOUND(I,1)=BMID-BINC
0212            BOUND(I,2)=BMID+BINC
0213        250 CONTINUE
0214      C
0215      C     LIST BOUNDS, TIMES, DEPTHS, AND STACKING VELOCITIES
0216      C
0217            WRITE(LIST,1110)
```

```
0218   1110 FORMAT(/" BOUNDS FOR OUTPUT TRACES (DISTANCE FROM WELL):"/
0219       +" TRACE NUMBER        CDP     BOUND ONE    BOUND TWO")
0220        WRITE(LIST,1120) ((I,CDP(I),BOUND(I,1),BOUND(I,2)),I=1,NTR)
0221   1120 FORMAT(6X,I3,6X,F8.2,5X,F8.2,5X,F8.2)
0222        WRITE(LIST,1130)
0223.  1130 FORMAT(/" TIME ",10(" DEPTH STACK"))
0224        WRITE(LIST,1140)
0225   1140 FORMAT(" (MS) ",10("  (FT)   VEL "))
0226        DO 260 I=1,KPTS,10
0227        II=I*LSR
0228        WRITE(LIST,9030) II,((ID(K),ISV(K)),K=I,I+9)
0229   9030 FORMAT(21I6)
0230    260 CONTINUE
0231   9020 FORMAT(20I6)
0232        WRITE(LIST,1150)
0233   1150 FORMAT(/3("   DEPTH    1ST BRK   CORRECTED STACKING     "))
0234        WRITE(LIST,1155)
0235   1155 FORMAT(3(22X,"TIMES   VELOCITY",5X))
0236        DO 9040 I=1,NGG,3
0237        GG(1)=G1FB+(I-1)*GIFB
0238        GG(2)=GG(1)+GIFB
0239        GG(3)=GG(2)+GIFB
0240        WRITE(LIST,1156)(GG(K),IFB(I+K-1),IFBC(I+K-1),ISVD(I+K-1),K=1,3)
0241   1156 FORMAT(3(F9.1,2X,I5,5X,I5,5X,I5,7X))
0242   9040 CONTINUE
0243  C
0244  C-----ZERO OUT OUTPUT TRACES
0245  C
0246        DO 300 I=1,NTR
0247        DO 300 J=1,KPTS
0248    300 BUF(J,I)=0.
0249        DO 301 I=1,NTR
0250        DO 301 J=1,1000
0251    301 IDUM(J,I)=0
0252  C
0253  C ----START STACKING
0254  C
0255  C
0256  C       D      - DEPTH OF GEOPHONE TRACE
0257  C       T0     - TIME OF ARRIVAL ON "VSPCDP" TRACES FOR CURRENT REFLECTION
0258  C       H      - DEPTH TO CURRENT REFLECTION
0259  C       R      - HORIZONTAL DISTANCE FROM WELL TO REFLECTION POINT
0260  C       T      - TIME OF ARRIVAL ON VSP UPGOING TRACES FOR CURRENT
0261  C                REFLECTION (THE EVENT AT THIS TIME WILL BE MAPPED
0262  C                INTO TIME T0 ON THE "VSPCDP" SECTION)
0263  C       BUF    - ARRAY CONTAINING "VSPCDP" TRACES
0264  C       X      - ARRAY CONTAINING VSP UPGOING TRACE
0265  C
0266        INC=1
0267        IMIN=(G1-G1FB)/GIFB
0268        DO 1000 I=1,NG
0269        D =G1+(I-1)*GI
0270        ISP=ISP1+(I-1)*ISPI
0271        KD=D
0272        IF(NGE.NE.0.AND.KD.EQ.NOPHON(INC)) GO TO 900
0273        WRITE(1,9000) ISP
0274   9000 FORMAT(" PROCESSING SHOTPOINT ",I5)
0275        CALL RDTAP(NPTS,ISP,IDSH,IMC,ITR,2,X,MAGIN,1)
0276        DO 500 J=1,KPTS
0277        T0=J*LSR
0278        H=ID(J)
0279        IF(H.LT.D) GO TO 500
0280        R=XS*(H-D)/(2*H-D)
0281        DO 400 K=1,NTR
0282        IF(R.GE.BOUND(K,1).AND.R.LT.BOUND(K,2)) GO TO 410
0283    400 CONTINUE
0284        GO TO 500
```

```
0285        410 ARG1=(XS-R)/ISV(J)*1000.
0286            ARG2=(XS-2*R)
0287            II=I+IMIN
0288            T=2.*SQRT(T0*T0/4.+ARG1*ARG1)-SQRT(ARG2*ARG2+D*D)/ISVD(II)*1000.
0289            PT=T/ISR
0290            IPT=PT
0291            PT=PT-IPT
0292            IF(IPT.LT.1.OR.IPT.GE.NPTS) GO TO 500
0293            BUF(J,K)=BUF(J,K)+X(IPT)+PT*(X(IPT+1)-X(IPT))
0294            IF(LOUT.NE.0) WRITE(LOUT,420) I,D,J,T0,H,R,K,T,IPT,PT
0295        420 FORMAT(I5,F7.0,I5,F10.4,F7.0,F10.4,I5,F10.4,I5,F10.4)
0296            I11=256*(J-(J/2)*2)
0297            IF(I11.EQ.0) I11=1
0298            I22=(J+1)/2
0299            IDUM(I22,K)=IDUM(I22,K)+I11
0300        500 CONTINUE
0301            GO TO 990
0302        900 INC=INC+1
0303        990 CONTINUE
0304       1000 CONTINUE
0305     C
0306     C-----WRITE OUTPUT TRACES TO TAPE
0307     C
0308            DO 2000 I=1,NTR
0309            DO 1990 J=1,KPTS
0310            I22=(J+1)/2
0311            I11=J-(J/2)*2
0312            ISAV=IDUM(I22,I)
0313            IF(I11.EQ.1) IAA=ISAV/256
0314            IF(I11.EQ.0) IAA=IAND(377B,ISAV)
0315            IF(IAA.EQ.0) IAA=1
0316       1990 X(J)=BUF(J,I)/IAA
0317            CALL RDTAP(KPTS,ISPO,IDSH,IMC,I,6,X,MAGOT,1)
0318       2000 CONTINUE
0319       9999 END
0320            END$
```

APPENDIX II

```
&MIGRT T=00004 IS ON CR00024 USING 00051 BLKS R=0000

0001  FTN4,L
0002  $EMA(KAY,0)
0003        PROGRAM MIGRT
0004  C
0005  C     <06-81, KDW>
0006  C
0007  C     PROGRAM TO CALCULATE THE "VSPCDP STACK" SECTION FROM THE
0008  C     UNALIGNED UPGOING EVENTS OF THE VSP.
0009  C     THIS IS A MODIFIED VERSION OF THE PROGRAM "STACK" SINCE IT
0010  C     ASSUMES THAT ALL BEDS ARE DIPPING WITH ANGLE "PHI" RATHER
0011  C     THAN HAVING HORIZONTAL BEDS.
0012  C
0013  C***********************************************************
0014  C
0015  C     VARIABLES USED IN PROGRAM "STACK"
0016  C
0017  C     LIST    - LOGICAL UNIT OF DEVICE TO LIST DATA TO
0018  C     MAGIN   - MAG TAPE LU TO READ VSP UPGOING TRACES FROM
0019  C     G1      - DEPTH OF THE SHALLOWEST GEOPHONE TRACE
0020  C     G2      - DEPTH OF THE DEEPEST GEOPHONE TRACE
0021  C     GI      - DISTANCE BETWEEN GEOPHONES
0022  C     NG      - TOTAL NUMBER OF GEOPHONES
0023  C     ISP1    - SHOTPOINT NUMBER OF GEOPHONE TRACE AT "G1"
0024  C     ISP2    - SHOTPOINT NUMBER OF GEOPHONE TRACE AT "G2"
0025  C     ISPI    - SHOTPOINT INCREMENT BETWEEN GEOPHONE TRACES
```

```
0026  C     IDSH    - DASH NUMBER FOR VSP UPGOING TRACES
0027  C     IMC     - MULT CODE NUMBER FOR VSP UPGOING TRACES
0028  C     NPTS    - NUMBER OF POINTS FOR VSP UPGOING TRACES
0029  C     ISR     - SAMPLE RATE (MS) FOR VSP UPGOING TRACES
0030  C     NGE     - NUMBER OF GEOPHONES TRACES TO ELIMINATE (NOISY)
0031  C     NOPHON  - ARRAY WHICH CONTAINS WHICH GEOPHONES TO ELIMINATE
0032  C     IFILE   - FILE LOCATION CONTAINING FIRST BREAKS
0033  C     IBLK    - BLOCK NUMBER IN IFILE WHERE FIRST BREAKS ARE LOCATED
0034  C     GF      - DEPTH OF THE FIRST GEOPHONE LOCATION IN "IFILE"
0035  C     IFB     - ARRAY CONTAINING THE FIRST BREAKS FOR GEOPHONES
0036 ,C                STARTING AT G1FB
0037  C     IFBC    - ARRAY CONTAINING THE FIRST BREAKS CORRECTED FOR
0038  C                ZERO SOURCE OFFSET FOR GEOPHONES STARTING AT G1FB
0039  C     VEL     - AVERAGE VELOCITY OF EARTH BELOW TD
0040  C     DVEL    - DATUM VELOCITY
0041  C     XS      - SOURCE OFFSET
0042  C                (+ MEANS SOURCE IS UPDIP)
0043  C                (- MEANS SOURCE IS DOWNDIP)
0044  C     PHI     - DIP ANGLE IN DEGREES
0045  C     MAGOT   - MAG TAPE LU TO WRITE "VSPCDP" TRACES TO
0046  C     NTR     - NUMBER OF "VSPCDP" TRACES TO OUTPUT TO TAPE
0047  C     LSR     - SAMPLE RATE OF "VSPCDP" TRACES
0048  C     KPTS    - NUMBER OF POINTS IN "VSPCDP" TRACES
0049  C     ISPO    - OUTPUT SHOTPOINT FOR "VSPCDP" TRACES
0050  C     CDP     - ARRAY CONTAINING DISTANCE FROM WELL FOR EACH "VSPCDP" TRACE
0051  C     BOUND   - ARRAY CONTAINING THE BOUNDS OVER WHICH ALL REFLECTIONS
0052  C                ARE STACKED FOR EACH "VSPCDP" TRACE
0053  C     ISVD    - ARRAY CONTAINING THE STACKING VELOCITY AT EACH GEOPHONE
0054  C                TRACE LOCATION (1 TO NG)
0055  C     ISV     - ARRAY CONTAINING THE STACKING VELOCITY AT EACH TIME
0056  C                INCREMENT (1 TO KPTS)
0057  C     ID      - ARRAY CONTAINING THE DEPTH AT EACH TIME INCREMENT (1 TO KPTS)
0058  C
0059        DIMENSION ID(2000),ISV(2000),BOUND(20,2),X(2000)
0060        DIMENSION IFBC(256),ISVD(256),IDCB(144),IFILE(5)
0061        DIMENSION NOPHON(100),IFB(256),GG(3),CDP(20)
0062        COMMON /KAY/ BUF(2000,20),IDUM(1000,20)
0063        CALL RMPAR(ID)
0064        WRITE(1,4)
0065      4 FORMAT("LIST DEVICE?  ←")
0066        READ(1,*) LIST
0067        WRITE(1,5)
0068      5 FORMAT("MAG TAPE INPUT FOR UPGOING EVENTS?  ←")
0069        READ(1,*) MAGIN
0070        WRITE(1,8)
0071      8 FORMAT("GEOPHONE START, STOP, INCREMENT?  ←")
0072        READ(1,*) G1,G2,GI
0073        ISP1=G1
0074        ISP2=G2
0075        ISPI=GI
0076        WRITE(1,10)
0077     10 FORMAT("SHOT POINT START, STOP, INCREMENT?  ←")
0078        READ(1,*) ISP1,ISP2,ISPI
0079        WRITE(1,11)
0080     11 FORMAT("NO. OF GEOPHONES TO ELIMINATE?  ←")
0081        READ(1,*) NGE
0082        CALL VINIT(NOPHON,0,100)
0083        IF(NGE.EQ.0) GO TO 13
0084        WRITE(1,12)
0085     12 FORMAT("GEOPHONES TO ELIMINATE?  ←")
0086        READ(1,*) (NOPHON(I),I=1,NGE)
0087     13 WRITE(1,14)
0088     14 FORMAT("DASH NO. AND MULT CODE OF VSP UPGOING TRACES?  ←")
0089        READ(1,*) IDSH,IMC
0090        WRITE(1,114)
0091    114 FORMAT("TRACE NUMBER?  ←")
0092        READ(1,*) ITR
```

```
0093       15 WRITE(1,20)
0094       20 FORMAT("NUMBER OF POINTS IN VSP UPGOING TRACES?  <")
0095          READ(1,*) NPTS
0096          IF(NPTS.GT.2000) GO TO 15
0097          WRITE(1,30)
0098       30 FORMAT("SAMPLE RATE OF VSP UPGOING TRACES (IN MILLISECONDS)?  <")
0099          READ(1,*) ISR
0100          WRITE(1,40)
0101       40 FORMAT("FOR FIRST BREAK TIMES, ENTER <")
0102          CALL GETFI(IFILE,1)
0103          WRITE(1,45)
0104       45 FORMAT("BLOCK NUMBER FOR FIRST BREAK TIMES?  <")
0105          READ(1,*) IBLK
0106          WRITE(1,46)
0107       46 FORMAT("FIRST AND LAST PHONE FOR FIRST BREAKS?  <")
0108          READ(1,*) G1FB,G2FB
0109          GIFB=GI
0110          IF(G1.LT.G1FB) GO TO 9999
0111          IF(G2.GT.G2FB) GO TO 9999
0112          NG=(G2-G1)/GI+1
0113          NGG=(G2FB-G1FB)/GIFB+1
0114          CALL GETD(IDCB,IER,IFILE,IFILE(4),IFILE(5),IFB,NGG,IBLK,1,1)
0115          WRITE(1,60) G2FB
0116       60 FORMAT("AVERAGE VELOCITY OF EARTH BELOW PHONE AT ",F5.0,"?  <")
0117          READ(1,*) VEL
0118          WRITE(1,61)
0119       61 FORMAT("NEAR SURFACE VELOCITY?  <")
0120          READ(1,*) DVEL
0121          WRITE(1,70)
0122       70 FORMAT("SOURCE OFFSET?  <")
0123          READ(1,*) XS
0124          XS=ABS(XS)
0125          WRITE(1,71)
0126       71 FORMAT("IS SOURCE UPDIP--1, OR SOURCE DOWNDIP--2?  <")
0127          READ(1,*) IANS
0128          IF(IANS.EQ.2) XS=-XS
0129       72 WRITE(1,73)
0130       73 FORMAT("DIP ANGLE (IN DEGREES)?  <")
0131          READ(1,*) PHI
0132          IF(PHI.LT.0.0.OR.PHI.GT.90.) GO TO 72
0133       75 WRITE(1,80)
0134       80 FORMAT("FOR OUTPUT VSPCDP TRACES, ENTER START POSITION"
0135         +"  STOP POSITION, AND INCREMENT"/
0136         +"  (ALL POSITIONS ARE RELATIVE TO WELL.  NEGATIVE POSITION"/
0137         +"   IS DOWNDIP FROM WELL, AND POSITIVE POSITION IS UPDIP)  <")
0138          READ(1,*) CDP1,CDP2,CDPI
0139          NTR=(CDP2-CDP1)/CDPI+1
0140          IF(NTR.GT.20) GO TO 75
0141          WRITE(1,84)
0142       84 FORMAT("SAMPLE RATE OF OUTPUT DATA?  <")
0143          READ(1,*) LSR
0144       85 WRITE(1,90)
0145       90 FORMAT("NO. OF OUTPUT PTS?  <")
0146          READ(1,*) KPTS
0147          IF(KPTS.GT.2000) GO TO 85
0148          WRITE(1,95)
0149       95 FORMAT("MAG TAPE LU OUT?  <")
0150          READ(1,*) MAGOT
0151          WRITE(1,96)
0152       96 FORMAT("OUTPUT SHOTPOINT?  <")
0153          READ(1,*) ISPO
0154    C
0155    C     WRITE PROGRAM PARAMETERS ON PRINTER
0156    C
0157          WRITE(LIST,1010) G1,G2,GI,NPTS,ISR,VEL,DVEL,XS,PHI,NTR,KPTS,
0158         + LSR,ISPO
0159     1010 FORMAT(" GEOPHONE START           =",F10.1/
```

```
0160        +       " GEOPHONE STOP             =",F10.1/
0161        +       " GEOPHONE INCREMENT        =",F10.1/
0162        +       " NO. INPUT PTS             =",I10/
0163        +       " INPUT SAMPLE RATE         =",I10/
0164        +       " AVERAGE VELOCITY BELOW TD =",F10.1/
0165        +       " NEAR SURFACE VELOCITY     =",F10.1/
0166        +       " SOURCE OFFSET             =",F10.1/
0167        +       "   (POS. SOURCE IS UPDIP)"/
0168        +       "   (NEG. SOURCE IS DOWNDIP)"/
0169        +       " DIP ANGLE (DEGREES)       =",F10.1/
0170        +       " NUMBER OF VSPCDP TRACES   =",I10/
0171        +       " NO. OUTPUT PTS            =",I10/
0172        +       " OUTPUT SAMPLE RATE        =",I10/
0173        +       " OUTPUT SHOT POINT         =",I10/)
0174            PHI=3.14159*PHI/180.
0175            TANPHI=TAN(PHI)
0176            IF(NGE.GT.0) WRITE(LIST,1020) NGE
0177       1020 FORMAT(" THE FOLLOWING",I5," GEOPHONES WERE ELIMINATED:")
0178            IF(NGE.GT.0) WRITE(LIST,1030) (NOPHON(I),I=1,NGE)
0179       1030 FORMAT(20X,I6)
0180       C
0181       C-----CALCULATE STACKING VELOCITIES AND DEPTHS
0182       C
0183       C-----IFB(256)  ARE FIRST BREAKS FOR EVERY PHONE LOCATION WITH SOURCE OFFSET
0184       C-----IFBC(256) ARE FIRST BREAKS FOR EVERY PHONE CORRECTED TO ZERO OFFSET
0185       C-----ID(2000)  IS DEPTH AS A FUNCTION OF VSPCDP REFLECTION TIME
0186       C-----ISV(2000) STACKING VELOCITY AS A FUNCTION OF VSPCDP REFLECTION TIME
0187       C-----ISVD(256) STACKING VELOCITIES FOR EVERY PHONE LOCATION
0188       C
0189            DO 110 I=1,NGG
0190            D=G1FB+(I-1)*GIFB
0191            DD=SQRT(D*D+XS*XS)
0192            ISVD(I)=DD*1000./IFB(I)
0193        110 IFBC(I)=D*1000./ISVD(I)
0194            DEPTH=VEL*LSR/2000.
0195            DO 140 I=1,KPTS
0196            ITIME=I*LSR/2.
0197            DO 115 J=1,NGG
0198            IF(ITIME.LE.IFBC(J)) GO TO 116
0199        115 CONTINUE
0200            GO TO 130
0201        116 T1=IFBC(J-1)
0202            T2=IFBC(J)
0203            D1=G1FB+(J-2)*GIFB
0204            D2=G1FB+(J-1)*GIFB
0205            V1=ISVD(J-1)
0206            V2=ISVD(J)
0207            IF(J.GT.1) GO TO 120
0208            T1=0.
0209            D1=0.
0210            V1=VEL
0211        120 ID(I)=D1+(D2-D1)*(ITIME-T1)/(T2-T1)
0212            ISV(I)=V1+(V2-V1)*(ITIME-T1)/(T2-T1)
0213            GO TO 135
0214        130 ID(I)=ID(I-1)+DEPTH
0215            SAVE=ID(I)*1000./ITIME
0216            ISV(I)=SAVE
0217        135 CONTINUE
0218        140 CONTINUE
0219       C
0220       C-----CALCULATE BOUNDS (XP1 AND XP2) FOR EACH OUTPUT TRACE
0221       C
0222            BINC=CDPI/2.
0223            DO 250 I=1,NTR
0224            BMID=CDP1+(I-1)*CDPI
0225            CDP(I)=BMID
0226            BOUND(I,1)=BMID-BINC
```

```
0227            BOUND(I,2)=BMID+BINC
0228        250 CONTINUE
0229  C
0230  C     LIST BOUNDS, TIMES, DEPTHS, AND STACKING VELOCITIES
0231  C
0232            WRITE(LIST,1110)
0233       1110 FORMAT(/" BOUNDS FOR OUTPUT TRACES (DISTANCE FROM WELL):"/
0234           +" TRACE NUMBER     CDP   BOUND ONE    BOUND TWO")
0235            WRITE(LIST,1120) ((I,CDP(I),BOUND(I,1),BOUND(I,2)),I=1,NTR)
0236       1120 FORMAT(6X,I3,6X,F8.2,5X,F8.2,5X,F8.2)
0237            WRITE(LIST,1130)
0238       1130 FORMAT(/" TIME ",10(" DEPTH STACK"))
0239            WRITE(LIST,1140)
0240       1140 FORMAT(" (MS) ",10("  (FT)   VEL "))
0241            DO 260 I=1,KPTS,10
0242            II=I*LSR
0243            WRITE(LIST,9030) II,((ID(K),ISV(K)),K=I,I+9)
0244       9030 FORMAT(21I6)
0245        260 CONTINUE
0246       9020 FORMAT(20I6)
0247            WRITE(LIST,1150)
0248       1150 FORMAT(/3("   DEPTH    1ST BRK   CORRECTED STACKING    "))
0249            WRITE(LIST,1155)
0250       1155 FORMAT(3(22X,"TIMES     VELOCITY",5X))
0251            DO 9040 I=1,NGG,3
0252            GG(1)=G1FB+(I-1)*GIFB
0253            GG(2)=GG(1)+GIFB
0254            GG(3)=GG(2)+GIFB
0255            WRITE(LIST,1156)(GG(K),IFB(I+K-1),IFBC(I+K-1),ISVD(I+K-1),K=1,3)
0256       1156 FORMAT(3(F9.1,2X,I5,5X,I5,5X,I5,7X))
0257       9040 CONTINUE
0258  C
0259  C-----ZERO OUT OUTPUT TRACES
0260  C
0261            DO 300 I=1,NTR
0262            DO 300 J=1,KPTS
0263        300 BUF(J,I)=0.
0264            DO 301 I=1,20
0265            DO 301 J=1,1000
0266        301 IDUM(J,I)=0
0267  C
0268  C ----START STACKING
0269  C
0270  C
0271  C     D       - DEPTH OF GEOPHONE TRACE
0272  C     H       - DEPTH TO THE POINT THAT THE REFLECTION INTERSECTS THE WELL
0273  C     THETA   - THE ANGLE BETWEEN THE INCIDENT WAVE AND DIPPING REFLECTOR
0274  C     XP      - HORIZONTAL DISTANCE FROM WELL TO REFLECTION POINT
0275  C     YP      - VERTICAL DISTANCE FROM SURFACE TO REFLECTION POINT
0276  C     R       - SAME AS XP
0277  C     T0      - TIME OF ARRIVAL ON "VSPCDP" TRACES FOR CURRENT REFLECTION
0278  C     ED      - DISTANCE BETWEEN SOURCE AND REFLECTION POINT
0279  C     DF      - DISTANCE BETWEEN REFLECTION POINT AND SURFACE IMAGE POINT
0280  C     BF      - DISTANCE BETWEEN GEOPHONE (RECEIVER) AND SURFACE IMAGE PT
0281  C     T       - TIME OF ARRIVAL ON VSP UPGOING TRACES FOR CURRENT
0282  C               REFLECTION (THE EVENT AT THIS TIME WILL BE MAPPED
0283  C               INTO TIME T0 ON THE "VSPCDP" SECTION)
0284  C     BUF     - ARRAY CONTANING "VSPCDP" TRACES
0285  C
0286            INC=1
0287            IMIN=(G1-G1FB)/GIFB
0288            DO 1000 I=1,NG
0289            D =G1+(I-1)*GI
0290            ISP=ISP1+(I-1)*ISPI
0291            KD=D
0292            IF(NGE.NE.0.AND.KD.EQ.NOPHON(INC)) GO TO 900
0293            WRITE(1,9000) ISP
```

```
0294.  9000 FORMAT(" PROCESSING SHOTPOINT ",I5)
0295        CALL RDTAP(NPTS,ISP,IDSH,IMC,ITR,2,X,MAGIN,1)
0296        DO 500 J=1,KPTS
0297        H=ID(J)
0298        ARG1=2.*H-D-XS*TANPHI
0299        ARG2=XS+D*TANPHI
0300        THETA=ATAN2(ARG1,ARG2)
0301        ARG1=TAN(THETA+PHI)
0302        XP=(-H+XS*ARG1)/(ARG1-TANPHI)
0303        YP=-XP*TANPHI+H
0304        XI=-D/TAN(THETA-PHI)
0305        R=XP
0306        IF(YP.LT.D) GO TO 500
0307        T0=2.*YP/ISV(J)*1000.
0308        JJ=(T0+LSR/2.)/LSR
0309        IF(JJ.LT.1.OR.JJ.GT.KPTS) GO TO 500
0310        DO 400 K=1,NTR
0311        IF(R.GT.BOUND(K,1).AND.R.LE.BOUND(K,2)) GO TO 410
0312    400 CONTINUE
0313        GO TO 500
0314    410 ED=SQRT(YP*YP+(XS-XP)**2)
0315        DF=SQRT(YP*YP+(XP-XI)**2)
0316        BF=SQRT(XI*XI+D*D)
0317        T=(ED+DF)/ISV(J)  -  BF/ISVD(I-IMIN)
0318        T=T*1000.
0319        PT=T/ISR
0320        IPT=PT
0321        PT=PT-IPT
0322        IF(IPT.LT.1.OR.IPT.GE.NPTS) GO TO 500
0323        BUF(JJ,K)=BUF(JJ,K)+X(IPT)+PT*(X(IPT+1)-X(IPT))
0324        I11=256*(JJ-(JJ/2)*2)
0325        IF(I11.EQ.0) I11=1
0326        I22=(JJ+1)/2
0327        IDUM(I22,K)=IDUM(I22,K)+I11
0328    500 CONTINUE
0329        GO TO 990
0330    900 INC=INC+1
0331    990 CONTINUE
0332   1000 CONTINUE
0333 C
0334 C-----WRITE OUTPUT TRACES TO TAPE
0335 C
0336        DO 2000 I=1,NTR
0337        DO 1990 J=1,KPTS
0338        I22=(J+1)/2
0339        I11=J-(J/2)*2
0340        ISAV=IDUM(I22,I)
0341        IF(I11.EQ.1) IAA=ISAV/256
0342        IF(I11.EQ.0) IAA=IAND(377B,ISAV)
0343        IF(IAA.EQ.0) IAA=1
0344   1990 X(J)=BUF(J,I)/IAA
0345        CALL RDTAP(KPTS,ISPO,IDSH,IMC,I,6,X,MAGOT,1)
0346   2000 CONTINUE
0347   9999 END
0348        END$
```

That which is claimed is:

1. A method for converting vertical seismic profiling (VSP) seismic data to surface seismic data, wherein the seismic source used to obtain said VSP seismic data was offset a desired distance from a borehole, said method comprising the steps of:
 (a) selecting a first VSP data trace from said VSP seismic data;
 (b) mapping segments of said first VSP data trace at respective VSP times into locations on a plot of surface seismic time as a function of distance from said borehole;
 (c) repeating steps (a) and (b) for at least a portion of the VSP data traces, other than said first VSP data trace, in said VSP seismic data; and
 (d) summing sections of each VSP data trace which are mapped into the same location in said plot to produce said surface seismic data.

2. A method in accordance with claim 1 wherein said seismic source is offset from said borehole a distance in the range of about 300 to about 3000 feet.

3. A method in accordance with claim 1 wherein the reflectors which reflected the energy from said source to geophones located at desired locations in said borehole were substantially parallel to the surface and wherein said step of mapping comprises:

(e) choosing a value for the surface seismic time ($T_{o,r}$);

(f) calculating a value for the VSP time ($t_{VSP}$) based on the chosen value of $T_{o,r}$;

(g) calculating the distance (q) between the reflection point and said borehole based on the chosen value of $T_{o,r}$;

(h) taking the data segment at the calculated time $t_{VSP}$ on said first VSP data trace and placing it at time $T_{o,r}$ on said plot at a location based on the calculated value of q; and (i) repeating steps (e)-(h) for a plurality of values of $T_{o,r}$.

4. A method in accordance with claim 3 wherein $T_{o,r}$ is chosen in increments of about 1 millisecond.

5. A method in accordance with claim 1 wherein a reflector dips with respect to the surface and wherein said step of mapping comprises:

(e) estimating a dip angle for said reflector;

(f) assuming that said reflector intersects said borehole at a depth h;

(g) calculating a value for the surface seismic time ($T_{o,r}$) based on the assumed value h;

(h) calculating a value for the VSP time ($t_{VSP}$) based on the assumed value of h;

(i) calculating the distance (q) between the reflection point and said borehole based on the chosen value of $T_{o,r}$;

(j) taking the data section at the calculated time $t_{VSP}$ on said first VSP data trace and placing it at time $T_{o,r}$ on said plot at a location based on the calculated value of q; and (k) repeating steps (e)-(j) for a plurality of values of h.

6. A method in accordance with claim 5 wherein h is incremented by values of about 5 feet.

* * * * *